United States Patent Office 2,804,434
Patented Aug. 27, 1957

2,804,434

PROCESS OF PRODUCING A POLYCONDENSATION PRODUCT FROM METHYLENE-BIS-CHLOROPROPIONIC ACID AMIDE

Rudolf Lotz, Klingenberg (Main), Germany, assignor to Vereinigte Glanzstoff - Fabriken Aktiengesellschaft, Wuppertal-Elberfeld, Germany, a German joint-stock company No Drawing. Application June 25, 1954,
Serial No. 439,482

Claims priority, application Germany June 27, 1953

2 Claims. (Cl. 260—2)

This invention relates to a process of producing polycondensation products from methylene-bis-chloropropionic acid amide. This compound is constituted according to the formula

—$Cl.CH_2.CH_2.CO.NH.CH_2.NH.CO.CH_2CH_2.Cl$— which may also be called (N,N'-bis[β-chloropropionyl] methylene diamine) It is easily obtainable by reacting a mixture of acrylic acid nitrile, formaldehyde, water vapor and hydrogen chloride at a temperature up to 400° C. in the gas phase. The compound melts precisely at 198° C. If it is acted upon at a temperature ranging between 60 and 100° C. and preferably 80 to 100° C. with a solution of sodium bicarbonate, an intermediate product will temporarily be formed and sodium chloride will separate out. The intermediate product can be isolated and then forms a pulverulent substance melting at 166° C. However, this substance is rather unstable and after a short time possesses a different melting point and becomes infusible.

Instead of isolating the intermediate product, one can gradually concentrate the reaction mixture while passing through it nitrogen gas and heating in vacuo, while separating the inorganic salts which are precipitated.

At the end of the reaction an inert organic liquid, for instance dioxane or tetrahydrofurane, is added and concentration is continued at a moderate temperature.

In this phase there is formed a concentration product having the character of a jelly which on cooling forms a transparent solid mass which is flexible, but dissolves only with difficulty in the usual solvents, merely dimethylformamide dissolving it easily.

The product resists boiling concentrated hydrochloric acid and sodium hydrate.

Films produced with the aid of this concentration product have a softening point of about 130° C. and are particularly useful in that they are acid and alkali proof.

From this condensation product other plastic masses can be formed, for instance in the form of ribbons.

*Example*

50 gr. methylene-bis-chloropropionic acid amide, 40 gr. sodium bicarbonate purissimum and 500 gr. distilled water are made to react with each other in a three-neck flask of at least 2 liters. The mixture is heated in such manner as to have a temperature of about 90° C. After about 15 minutes the reaction mixture starts frothing and a colorless gas escapes. After another 15 minutes the reaction mixture has become limpid. It is now stirred by mechanical means for about 8 hours at the same temperature and at the end of this period is freed by filtration from a brown residue which mainly consists of inorganic constituents. The filtrate is now concentrated at elevated temperature and after a short time becomes turbid and has a milky appearance. During 4 hours concentration another frothing occurs. The mixture is now strongly cooled down by means of ice and is once more separated from the inorganic residue. On concentrating it in vacuo sodium chloride is precipitated and separated by quick suction, whereupon dioxane is added to the filtrate which is once more heated until the solution has slowly solidified, forming a jelly, which, after cooling, forms a transparent, solid and flexible mass, which is soluble in dimethylformamide. It can be used in the formation of films which have a softening point of about 130° C.

Various changes may be made in the steps described in the foregoing specification without departing from the invention or sacrificing the advantages thereof.

I claim:

1. The method of producing a polycondensation product from methylene-bis-chloropropionic acid amide which comprises acting on methylene-bis-chloropropionic acid amide with sodium bicarbonate at a temperature ranging between 60 and 100° C., concentrating the solution which has formed, adding to the solution an inert organic liquid and then continuing concentration of the solution at an elevated temperature.

2. The process of claim 1, in which sodium bicarbonate and water are caused to act on methylene-bis-chloropropionic acid amide at a temperature of about 90° C., stirring the solution until a residue has settled, separating the liquid from the solid, concentrating the liquid, heating it with dioxane and allowing the mixture to solidify.

No references cited.